United States Patent [19]

Takimoto

[11] Patent Number: 5,038,629
[45] Date of Patent: Aug. 13, 1991

[54] DRIVE TRANSMISSION MECHANISM

[75] Inventor: Kazushi Takimoto, Kadoma, Japan

[73] Assignee: Mita Industrial Co., Ltd., Osaka, Japan

[21] Appl. No.: 439,079

[22] Filed: Nov. 20, 1989

[30] Foreign Application Priority Data

Nov. 28, 1988 [JP] Japan .................. 63-301931

[51] Int. Cl.$^5$ .................. F16H 1/12; F16H 13/02
[52] U.S. Cl. .................. 74/421 A; 74/206
[58] Field of Search .................. 74/421 R, 421 A, 206

[56] References Cited

U.S. PATENT DOCUMENTS

| | | | |
|---|---|---|---|
| 374,146 | 11/1887 | Essex | 74/421 R |
| 654,933 | 7/1900 | Appelgate | 74/421 R |
| 760,218 | 5/1904 | Lefinski | 74/421 R |
| 1,502,456 | 7/1924 | Bee | 74/421 R |
| 1,585,361 | 5/1926 | Bee | 74/421 R |
| 2,831,364 | 4/1958 | Chambers et al. | 74/434 |
| 2,908,180 | 10/1959 | Swenson | 74/421 R |
| 3,813,956 | 6/1974 | Whitecar | 74/219 |
| 4,478,101 | 10/1984 | Rumsa | 74/421 R |
| 4,487,067 | 11/1984 | Stebbins et al. | 74/206 X |

FOREIGN PATENT DOCUMENTS 1448923 7/1966 France .
53730 1/1943 Netherlands .

Primary Examiner—Allan D. Herrmann
Assistant Examiner—David W. Laub
Attorney, Agent, or Firm—Jordan and Hamburg

[57] ABSTRACT

A drive transmission mechanism comprising a drive wheel fixed to a drive shaft, a plurality of intermediate wheels supported by a support shaft and each having a first transmission wheel and a second transmission wheel different from each other in diameter and rotatable together, and a driven wheel fixed to a driven shaft, the drive wheel being coupled to the first transmission wheel of the first intermediate wheel counted from the drive side, the second transmission wheel of the (n−1)th intermediate wheel as counted from the drive side being coupled to the first transmission wheel of the nth intermediate wheel as counted similarly, n being an optional integer of not smaller than 2, the second transmission wheel of the last intermediate wheel as counted from the drive side being coupled to the driven wheel, at least two of the drive wheel, the intermediate wheels and the driven wheel being mounted on the same shaft rotatably relative to each other.

17 Claims, 7 Drawing Sheets

DRIVE TRANSMISSION MECHANISM

BACKGROUND OF THE INVENTION AND RELATED ART STATEMENT

The present invention relates to a drive transmission mechanism for transmitting the rotational driving force of a drive shaft connected to a motor or like drive source to a driven shaft on speed reduction or increase.

A gear mechanism, transmission mechanism comprising a pair of toothed pulleys and a timing belt, or the like is most widely used for transmitting the rotation of a drive shaft to a driven shaft. When a great reduction ratio or increase ratio is required for the transmission, mechanisms comprising, for example, a plurality of idle gears each having two spur gears and different from one another in gear ratio are generally used.

FIG. 5 shows an example of such mechanism. With reference to the drawing, indicated at 101 and 101' are upright inside plates provided in the interior of an apparatus. A motor 102 serving as a drive source is mounted on the inside plate 101. A specified number of intermediate shafts 103 are fixed, each at its one end, to the inside plate 101', which also supports a driven shaft 105 by a bearing 104 rotatably.

The drive shaft 102a of the motor 102 fixedly carries a drive gear 106 to rotate the gear therewith. Similarly, a driven gear 107 is fixed to the driven shaft 105. An intermediate gear 108 is mounted on each of the intermediate shafts 103 and is rotatable relative to the shaft 103. The intermediate gear 108 comprises a large gear 108a and a small gear 108b integral with the gear 108a and different therefrom in diameter. The large gear 108a of the intermediate gear 108 most proximate to the drive shaft 102a is in mesh with the drive gear 106, and the small gear 108b of this intermediate gear 108 is in mesh with the large gear 108a of the second intermediate gear 108. Through similar meshing engagement between the other gears including the small gear 108b of the last intermediate gear 108 in mesh with the driven gear 107, the drive shaft 102a is coupled to the driven shaft 105.

With the above mechanism, the rotation of the drive shaft 102a of the motor 102 is transmitted via the drive gear 106, the plurality of intermediate gears 108 and the driven gear 107 to the driven shaft 105 upon a great reduction.

FIG. 6 shows another mechanism wherein toothed pulleys and timing belts are used in place of the above gears.

With reference to the drawing, a drive pulley 109 is fixed to a drive shaft 102a, and a driven pulley 110 to a driven shaft 105. An intermediate pulley 111 of a double structure having a large pulley 111a and a small pulley 111b is rotatably supported on each of intermediate shafts 103. The drive pulley 109 is coupled to the large pulley 111a of the first intermediate pulley 111 by a timing belt 112, the small pulley 111b of the first intermediate pulley 111 to the large pulley 111a of the second intermediate pulley 111 by another timing belt 112, and the small pulley 111b of the second intermediate pulley 111 to the driven pulley 110 by another timing belt 112.

With this mechanism, the rotation of the drive shaft 102a is also transmitted to the driven shaft 105 upon a reduction as in the case of the mechanism of FIG. 5.

However, the mechanisms of FIGS. 5 and 6 have the following problems to be solved.

With the mechanisms described, the intermediate gears 108 or the intermediate pulleys 111 need to be supported by the respective intermediate shafts 103, so that a larger space is required with an increase in the number of gears or pulleys, making it difficult to compact the body of the apparatus including the mechanism. The mechanisms further have the drawback of being complex in construction, necessitating many shafts and therefore being costly.

SUMMARY OF THE INVENTION

The main object of the present invention is to provide a drive transmission mechanism free of the above problems.

As specific means for solving the problems, the present invention provides a mechanism comprising a drive wheel fixed to a drive shaft, a plurality of intermediate wheels supported by a support shaft and each having a first transmission wheel and a second transmission wheel different from each other in diameter and rotatable together, and a driven wheel fixed to a driven shaft, the drive wheel being coupled to the first transmission wheel of the first intermediate wheel counted from the drive side, the second transmission wheel of the $(n-1)$th intermediate wheel as counted from the drive side being coupled to the first transmission wheel of the nth intermediate wheel as counted similarly, n being an optional integer of not smaller than 2, the second transmission wheel of the last intermediate wheel as counted from the drive side being coupled to the driven wheel, at least two of the drive wheel, the intermediate wheels and the driven wheel being mounted on the same shaft rotatably relative to each other.

With the drive transmission mechanism described above, the rotation of the drive shaft is transmitted to the driven shaft via the drive wheel, the intermediate wheels and the driven wheel. The number of shafts required can be reduced in corresponding relation to the common use of the shaft for the wheels concerned. This greatly reduces the space needed, simplifies the mechanism in construction and renders the mechanism less costly, whereas the mechanism achieves as great a reduction ratio or speed increase ratio as is achieved conventionally.

The intermediate wheels, when shaped identically, can be manufactured at a reduced cost.

Furthermore, at least one of the intermediate wheels is formed with a stepped portion between the first transmission wheel and the second transmission wheel, whereby the intermediate wheel to be coupled to this intermediate wheel can be positioned axially thereof. This eliminates the need for a retaining ring or like positioning member to result in a lower cost and a further reduction in the required space.

The above and other objects, features and advantages of the present invention will become more apparent from the following detailed description with reference to the accompanying drawings.

DESCRIPTION OF THE PREFERRED EMBODIMENTS

A first embodiment of the invention will be described with reference to FIGS. 1 and 2.

Figure 2:
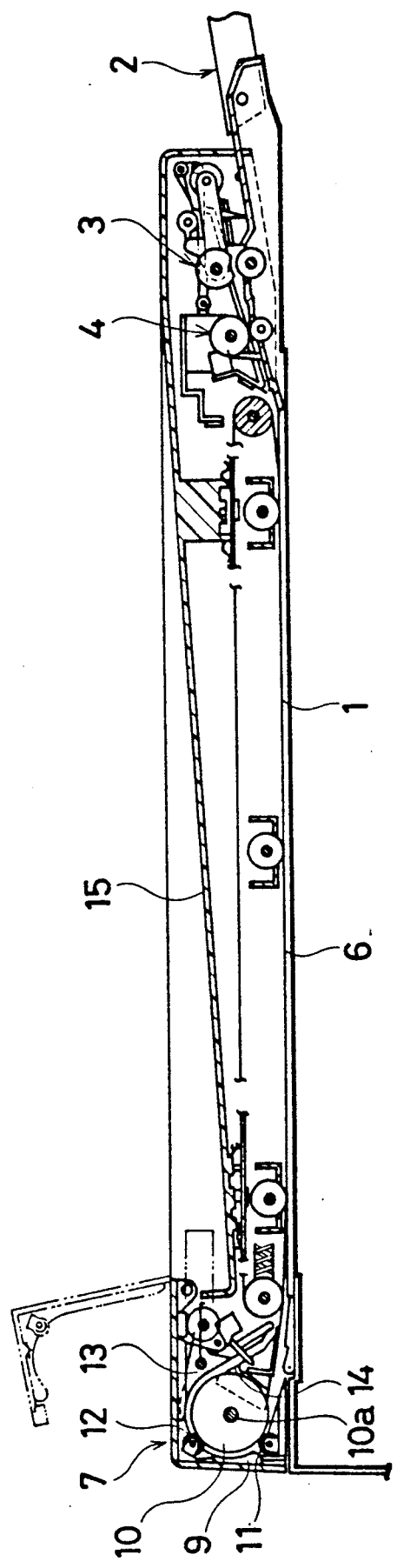
FIG. 2 is a front view in section of an automatic duplex document feeder including the transmission mechanism.

FIG. 2 shows the interior construction of an automatic feeder for duplex (double-faced) documents which includes a drive transmission mechanism of the present invention. The feeder has the function of feeding the document onto a contact glass plate 1 of a copying machine and discharging the document, and the function of reversing the fed document and feeding the document onto the glass plate 1 again.

The feeder has a feed assembly including a document tray 2, a feed roller 3, a pair of register rollers 4, etc. A conveyor belt 6 is provided above the glass plate 1. Disposed downstream from the belt is a mechanism 7 for reversing the document.

The document reversing mechanism 7 comprises a guide member 9 and a reversing roller 10 having transport rollers 11, 12 in pressing contact with the roller 10. A switch guide plate 13 is disposed downstream from the roller 12.

The switch guide plate 13 is shiftable between a first position as illustrated and a second position to which the plate 13 is slightly rotated counterclockwise in FIG. 2 from the first position. When in the first position, the switch guide plate 13 forms with the reversing roller 10 a return passage 14 through which the document is returned onto the glass plate 1. When in the second position, the plate 13 provides a document discharge passage for guiding the document to a discharge tray 15. The drive transmission mechanism (speed reduction mechanism) of the present invention is installed in the feeder for driving the shaft (driven shaft) 10a of the reversing roller 10.

The transmission mechanism will be described with reference to FIG. 1.

The drawing shows upright inside plates 20, 20' provided in the feeder, and a motor 21 fixed to the inside plate 20 and having a drive shaft 21a projecting toward the inside plate 20'. An intermediate shaft 22 is fixed at its one end to the inside plate 20'. The shaft 10a of the reversing roller 10 is positioned in alignment with the drive shaft 21a and rotatably supported by a bearing 23 on the inside plate 20'.

A drive gear 24 having a pitch circle of small diameter is fixed to the drive shaft 21a with a screw 25. A driven gear 26 having a pitch circle of large diameter is mounted on the roller shaft 10a and held to the shaft 10a against rotation. More specifically, a pin 10b extends through the shaft 10a, with opposite ends of the pin 10b projecting outward from the roller shaft periphery. A groove 26a formed in the driven gear 26 has the pin ends fitted therein.

The drive gear 24 is coupled to the driven gear 26 by three intermediate gears 27 to 29 which are all identical in shape. Each of the intermediate gears 27 to 29 comprises a large gear (first transmission wheel) 27a (28a, 29a) having the same pitch circle as the driven gear 26, and a small gear (second transmission wheel) 27b (28b, 29b) integral with the large gear and having the same pitch circle as the drive gear 24. A stepped portion 27c (28c, 29c) is formed between the large gear 27a (28a, 29a) and the small gear 27b (28b, 29b). The longitudinal ends of the larger and small gears 27a, (28a, 29a), 27b, (28b, 29b ) are designated as end faces, the end faces of the large gear 28a, for example, being shown at 28d and 28e in FIGS. 1 and 3. The gears mesh with one another in the following relationship.

(1) The drive gear 24 and the large gear 27a of the intermediate gear 27.
(2) The small gear 27b of the intermediate gear 27 and the large gear 28a of the intermediate gear 28.
(3) The small gear 28b of the intermediate gear 28 and the large gear 29a of the intermediate gear 29.
(4) The small gear 29b of the intermediate gear 29 and the driven gear 26.

Thus, with the present mechanism, the meshing pairs of gears 24, 27 to 29 and 26 are all equal in speed transmission ratio.

The mechanism is further characterized in that the intermediate gears 27, 29 are supported by the intermediate shaft 22 rotatably relative to each other, and that the intermediate gear 28 is supported by the roller shaft 10a rotatably relative to the shaft 10a and also to the driven gear 26. Stated more specifically, the intermediate gears 27, 29 as arranged in superposed layers (in series) are mounted on the intermediate shaft 22 rotatably relative to the shaft 22 and positioned in place by a retaining ring 30 axially of the shaft. The intermediate gear 28 mounted on the roller shaft 10a is positioned closer to the motor 21 than the driven gear 26 and held in this position axially thereof by the contact of one end face 28d of its large gear 28a with a transverse contact surface 27d of the stepped portion 27c of the intermediate gear 27. The end face 28d of the gear 28a is also referred to as an engaging end surface because it engages the transverse contact surface 27d of the step portions 27c.

With the mechanism described above, suppose the gear-to-gear speed transmission ratio is i (i<1), and the angular velocity of the drive shaft 21a rotated by the operation of the motor 21 is $\omega$. The intermediate gear 27 in mesh with the drive gear 24 fixed to the drive shaft 21a then rotates at an angular velocity of $\omega i$. Further the intermediate gear 28 meshing with this intermediate gear 27 rotates at an angular velocity of $\omega i^2$, the intermediate gear 29 meshing with the gear 28 rotates at an angular velocity of $\omega i^3$, and the driven gear 26 meshing with the gear 29 rotates with the roller shaft 10a at an angular velocity of $\omega i^4$. Thus, the mechanism transmits the rotation of the drive shaft 21a to the roller shaft 10 at a reduction ratio of $i^4$.

Figure 5:
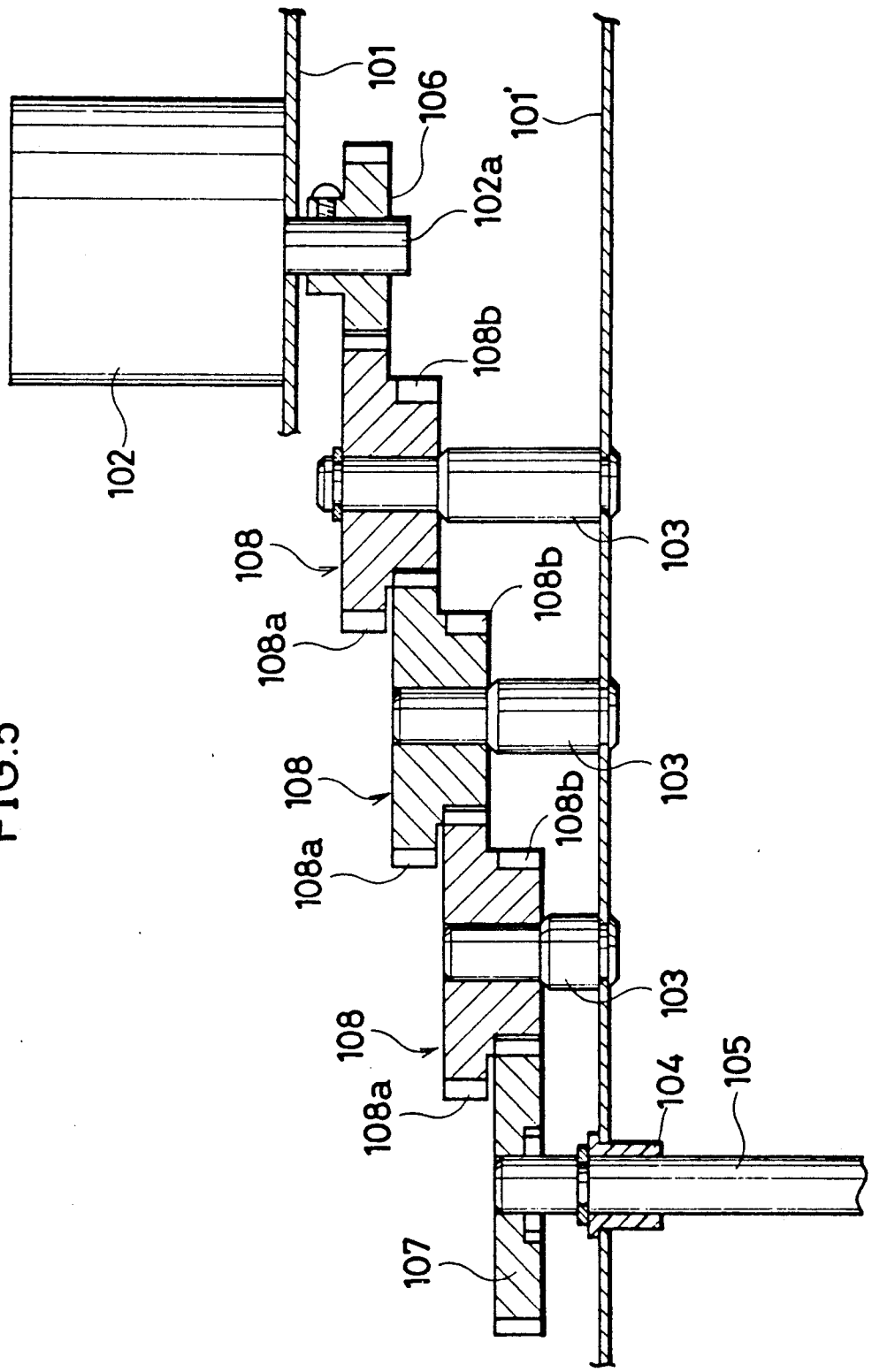
FIGS. 5 and 6 are plan views in section of conventional drive transmission mechanisms.
Figure 6:
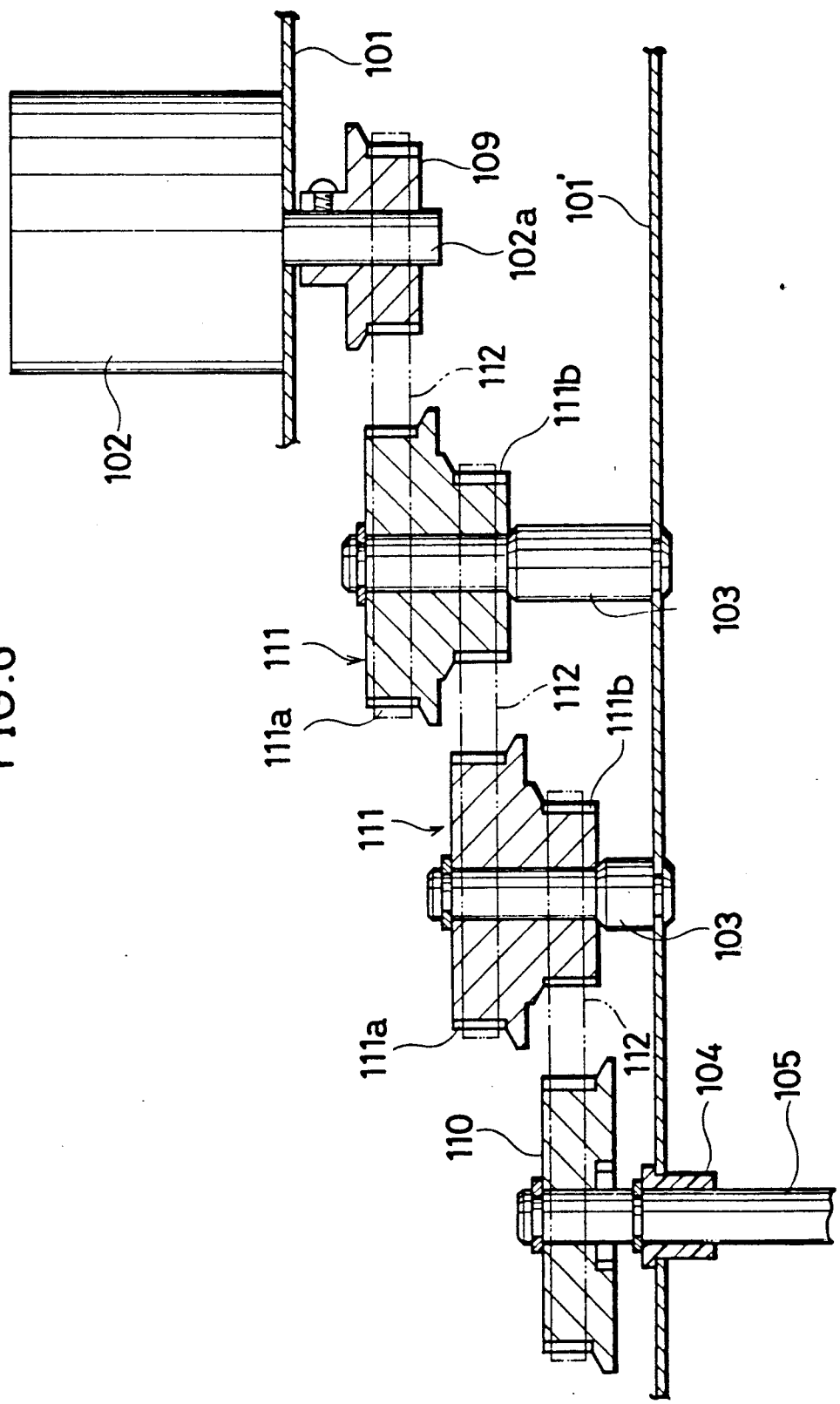

The present mechanism requires five gears like the mechanism of FIG. 5, whereas these gears can be supported by three shafts, i.e., the drive shaft 21a, roller shaft 10a and single intermediate shaft 22. This serves to greatly reduce the space required to compact the body of the apparatus (i.e. the automatic document feeder), further making the mechanism simplified in construction and less costly.

When the intermediate gears 27 to 29 are shaped identically as in the present embodiment, a further cost reduction can be achieved. If the intermediate gear 28 is positioned in place by the stepped portion 27c of the intermediate gear 27 as stated above, a positioning member such as a retaining ring can be dispensed with. This leads to a further cost reduction and also makes it possible to position, for example, the drive shaft 21a very close to the roller shaft 10a end-to-end as illustrated for a greater reduction in the space needed.

Figure 1:
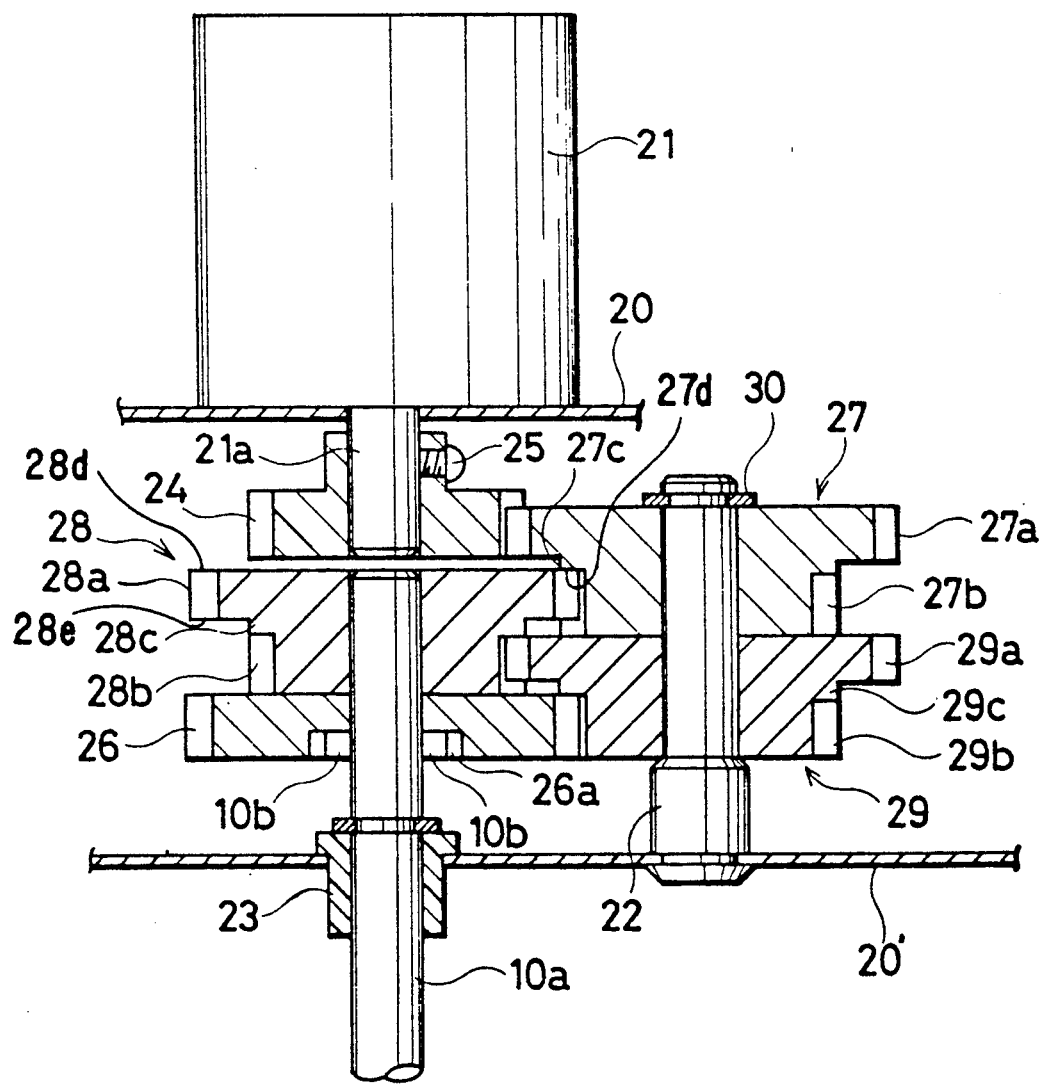
FIG. 1 is a plan view in section of a drive transmission mechanism as a first embodiment of the invention.

Although the intermediate gears 27 to 29 need not always be made common according to the present invention, the gear arrangement shown in FIG. 1 requires that the pairs of meshing gears be definite in the axis-to-axis distance, more specifically in the sum of diameters of the pitch circles (the sum of tooth numbers in the case of equal modules).

The advantages of the invention can be obtained insofar as at least two gears or the like are supported by the same shaft and made rotatable relative to each other. With the mechanism of FIG. 1, for example, the intermediate gears 27, 29 may be supported by individual support shafts. The single roller shaft 10a supporting both the intermediate gear 28 and the driven gear 26 still serves to reduce the space by a corresponding amount. The intermediate gears 27, 29 need only to be rotatable relative to each other. For example, the intermediate gear 27 may be fixed to the intermediate shaft 22 and made rotatable with the shaft 22, with the intermediate gear 29 mounted on the shaft 22 rotatably relative thereto. A plurality of gears may be mounted on the drive shaft 21a. Alternatively, the drive shaft 21a and the roller shaft 10a may be provided with the drive gear 24 and the driven gear 26 only, respectively, with at least two of the intermediate gears mounted on one shaft.

With these arrangements, the drive side and the driven side may be replaced by each other to use the arragement as a speed increasing mechanism.

Figure 3:
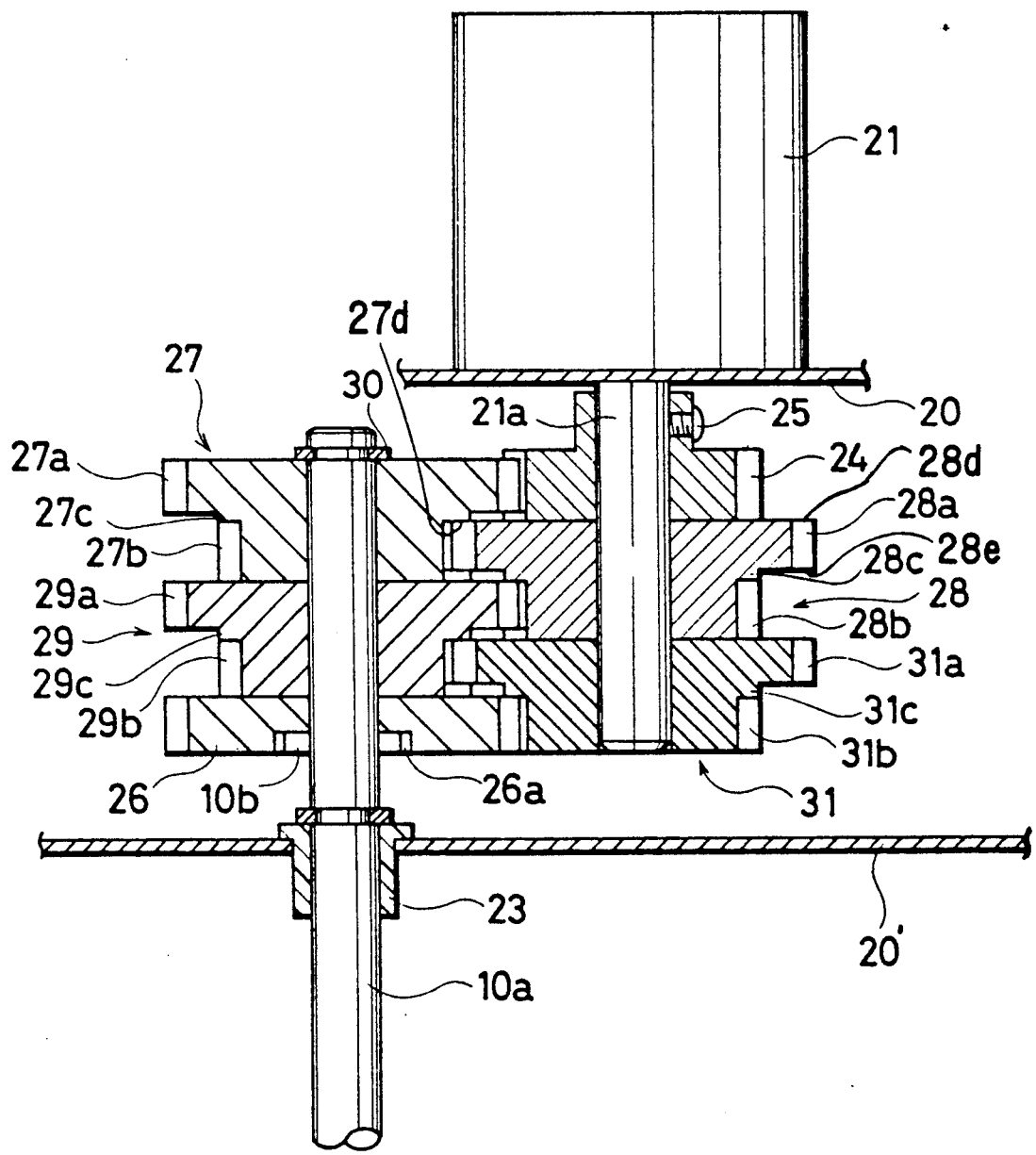
FIG. 3 a plan view in section of another drive transmission mechanism as a second embodiment.

A second embodiment will be described with reference to FIG. 3.

This embodiment is characterized in that it comprises four intermediate gears, i.e., the above intermediate gears 27 to 29, and another intermediate gear 31 shaped identically with these gears and having a large gear 31a, a stepped portion 31c and a small gear 31b, all the gears being supported by only two shafts, i.e., the drive shaft 21a and the roller shaft 10a.

Stated more specifically, the drive shaft 21a has mounted thereon the drive gear 24, intermediate gear 28 and intermediate gear 31 as arranged from the motor (21) side toward the inside plate 20'. The roller shaft 10a carries the driven gear 26, intermediate gear 29 and intermediate gear 27 as arranged from the reversing roller (10) side toward the inside plate 20. All the gears other than the drive gear 24 and the driven gear 26 are rotatable relative to the shaft concerned. The gears on the roller shaft 10a are positioned in place by a retaining ring 30. The gears on the drive shaft 21a are positioned in place by the contact of the stepped portion 31c of the intermediate gear 31 at the shaft end with one side face of toothed portion of the driven gear 26.

Thus according to the present invention, all the gears can be supported by only two shafts, i.e., the drive shaft and the driven shaft. This results in a great reduction in the space required.

The terms "drive shaft" and "driven shaft" as used herein have relative meanings; the "drive shaft" need not always be connected directly to the drive source, nor is it always required that the "driven shaft" be connected directly to the member to be driven. In other words, these shafts may be connected to the drive source or driven member by another drive transmission means.

Figure 4A:
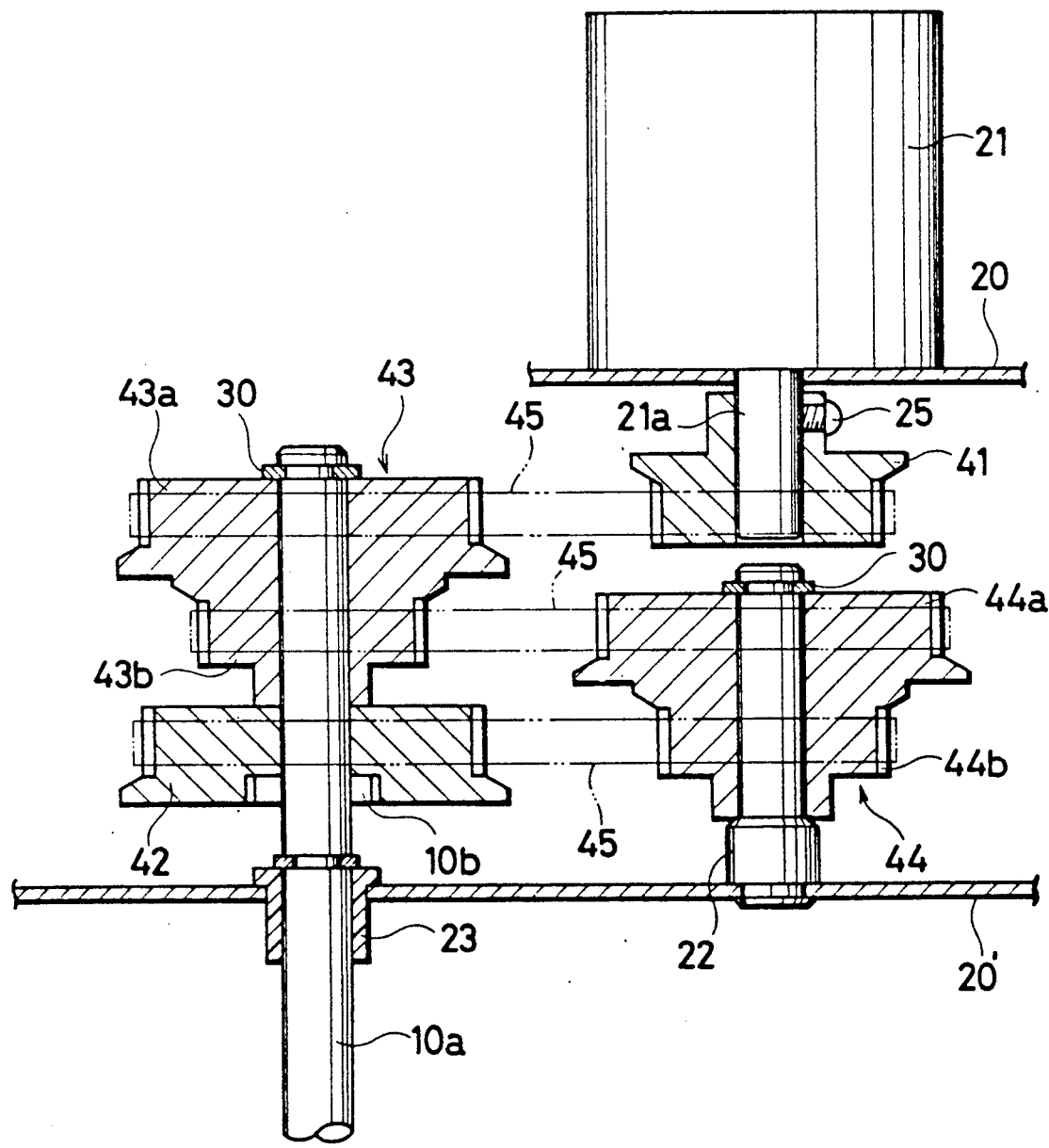
FIG. 4A a plan view in section of another drive transmission as a third embodiment.

A third embodiment will be described with reference to FIG. 4A, which shows an arrangement wherein toothed pulleys and timing belts are used in place of the above gears.

A drive pulley 41 is fixed to the drive shaft 21a of the motor 21 with a screw 25. A driven pulley 42 is fixed to the roller shaft 10a against rotation. An intermediate pulley 43 is rotatably mounted on the roller shaft 10a and positioned adjacent to the driven pulley 42. An intermediate shaft 22 fixed to the inside plate 20' has mounted thereon an intermediate pulley 44 rotatably relative to the shaft 22. Each of the intermediate pulleys 43, 44 has a large pulley (first transmission wheel) 43a (44a) and a small pulley (second transmission wheel) 43b (44b) and is positioned in place by a retaining ring 30 axially of the shaft. The pulleys are coupled to one another by timing belts 45 in the following relationship.

(1) The drive pulley 41 and the large pulley 43a of the intermediate pulley 43.

(2) The small pulley 43b of the intermediate pulley 43 and the large pulley 44a of the intermediate pulley 44.

(3) The small pulley 44b of the intermediate pulley 44 and the driven pulley 42.

With the above mechanism, the torque of the motor 21 can also be transmitted to the roller shaft 10a via the drive pulley 41, intermediate pulleys 43, 44 and driven pulley 42 upon a great speed reduction. With the intermediate pulley 43 and the driven pulley 42 supported by the same shaft (roller shaft 10a), the space required can be diminished.

Thus, the present invention can be embodied with use of drive transmitting wheels of any type which include not only gears or toothed pulleys but also frictional wheels or usual pulleys for use with belts.

Figure 4B:
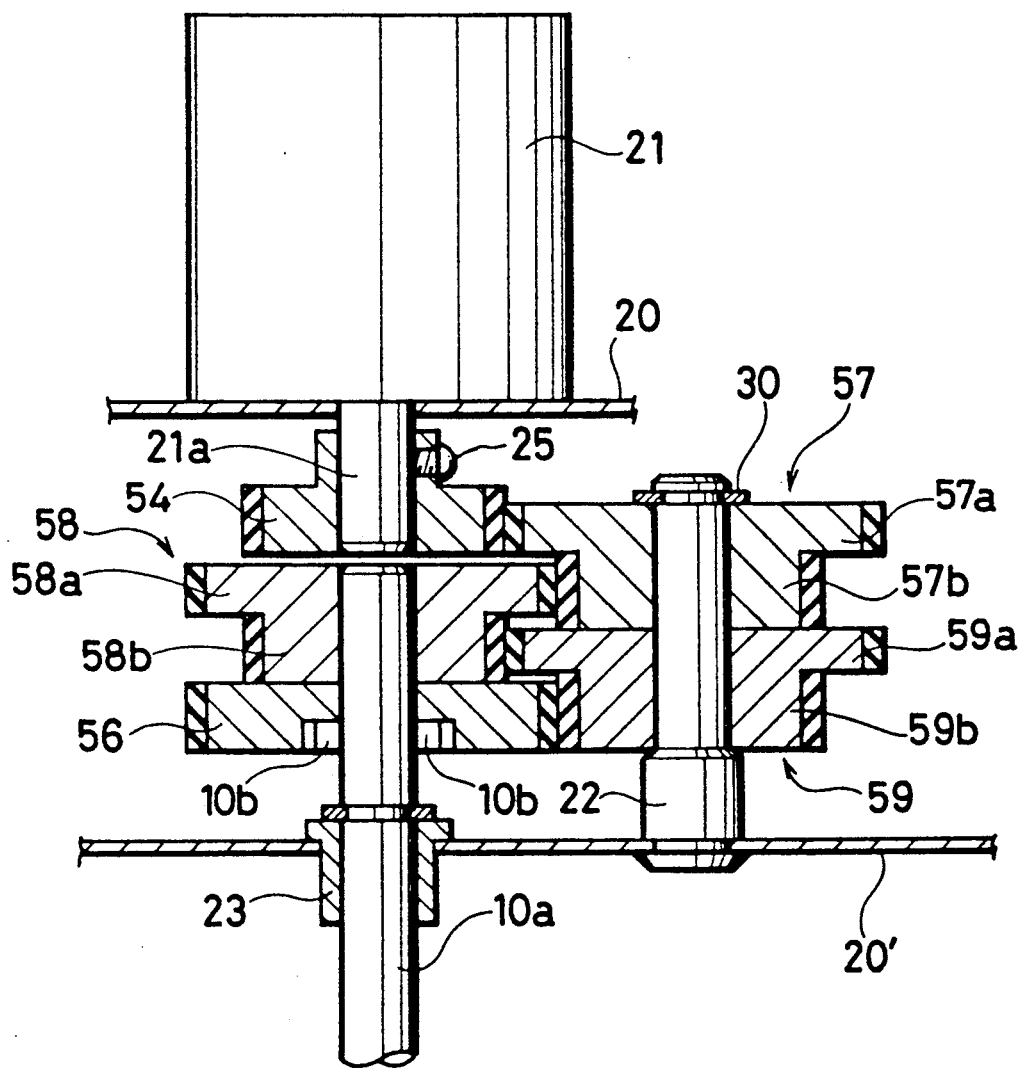
FIG. 4B is a plan view in section of another drive transmission mechanism as a forth embodiment.

As shown in FIG. 4B illustrating a fourth embodiment, for example, frictional wheels are used in place of the above gears or toothed pulleys.

A drive frictional wheel 54 having a small diameter is fixed to the drive shaft 21a of the motor 21 with a screw 25. A driven frictional wheel 56 having a large diameter is mounted on the roller shaft 10a and held to the shaft 10a against rotation as the first embodiment.

The drive frictional wheel 54 is coupled to the driven frictional wheel 56 by three intermediate frictional wheels 57 to 59 which are all identical in shape. Each of the intermediate frictional wheels 57 to 59 include a larger frictional wheel 57a (58a, 59a) having the same diameter as the driven frictional wheel 56, and a small frictional wheel 57b (58b, 59b) integral with the large frictional wheel and having the same diameter as the drive wheel 54. The frictional wheels engage with one another in the following relationship.

(1) The drive frictional wheel 54 and the large frictional wheel 57a.

(2) The small frictional wheel 57b and the large frictional wheel 58a.

(3) The small frictional wheel 58b and the large frictional wheel 59a.

(4) The small frictional wheel 59b and the driven frictional wheel 56.

The foregoing embodiments are drive transmission mechanisms for use in automatic duplex document feeders, whereas the invention is not limited thereto but is also applicable to various devices or apparatus which reguire speed reduction or increase.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A drive mechanism comprising:
a drive shaft;
a drive wheel mounted on said drive shaft;
a driven shaft;
a driven wheel mounted on said driven shaft;
a support shaft; said drive shaft, driven shaft, and said support shaft being axially parallel;
first intermediate wheel means disposed on said driven shaft and second intermediate wheel means disposed on said support shaft, said second intermediate wheel means being coupled to said first intermediate wheel means and to said drive gear such that said drive shaft drives said driven shaft via said first and second intermediate wheel means;
said first intermediate wheel means comprising at least one rotary wheel having one transmission part of one diameter and another transmission part of another diameter;
said second intermediate wheel means comprising at least one other rotary wheel having one transmission part of one diameter and another transmission part of another diameter;
said one transmission part of said one rotary wheel being operably coupled in driving relationship to said other transmission part of said other rotary wheel, said one transmission part of said one rotary wheel having an engaging end surface perpendicular to said axially parallel shafts, said other rotary wheel having a transverse contact surface perpendicular to said axially parallel shafts and contacting said engaging end surface to preclude axial relative displacement in one axial direction between said one and said other rotary wheels.

2. A drive mechanism according to claim 1, wherein said transmission parts comprise gear teeth, said gear teeth of said one transmission part of said one rotary wheel having one end face which constitutes said engaging end surface.

3. A drive mechanism according to claim 2, wherein said one end face is designated a first end face, said gear teeth of said one transmission part of said one rotary wheel having a second end face parallel to said first end face, the gear teeth of said other transmission part of said one rotary wheel having third and fourth end faces parallel to said first and second end faces, the distance between said first and fourth end faces defining the maximum axial length of said one rotary wheel, the distance between said first and third end faces being greater than the axial length of the gear teeth of said other transmission part of said other rotary wheel.

4. A drive mechanism according to claim 3, wherein said one and said other rotary wheels have the same configuration such that said other rotary wheel has first to fourth end faces corresponding to said first to fourth end faces on said one rotary wheel, said third end face of said other rotary wheel constituting said transverse contact surface.

5. A drive mechanism according to claim 3, wherein said one rotary wheel has a cylindrical portion extending axially between said second and third end faces, said cylindrical portion being coaxial with said drive shaft.

6. A drive mechanism according to claim 1, wherein one and said other rotary wheels have the same configuration.

7. A drive mechanism according to claim 1, wherein said one rotary wheel is relatively rotatably mounted on said driven shaft.

8. A drive mechanism according to claim 1, wherein said second intermediate wheel means comprises a plurality of rotary wheels mounted on said support shaft, each rotatable relative to one another.

9. A drive mechanism according to claim 1, wherein said drive shaft and said driven shaft are coaxially, said support shaft being spaced from said coaxial drive shaft and driven shaft.

10. A drive mechanism according to claim 1, wherein said one transmission part of said one rotary wheel has a diameter greater than the diameter of said other transmission part of said other rotary wheel.

11. A drive mechanism according to claim 1, wherein said one transmission part of said one rotary wheel has a diameter less than the diameter of said other transmission part of said other rotary wheel.

12. A drive mechanism comprising:
a drive shaft;
a drive wheel mounted on said drive shaft;
a driven shaft parallel to said drive shaft;
a driven wheel mounted on said driven shaft;
first intermediate wheel means disposed on said drive shaft and second intermediate wheel means disposed on said support shaft, said first intermediate wheel means being coupled to said second intermediate wheel means such that said drive shaft drives said driven shaft via said first and second intermediate means;
said first intermediate wheel means comprising at least one rotary wheel having one transmission part of one diameter and another transmission part of another diameter;
said second intermediate wheel means comprising at least one other rotary wheel having one transmission part of one diameter and another transmission part of another diameter;
said one transmission part of said one rotary wheel being operably coupled in driving relationship to said other transmission part of said other rotary wheel, said one transmission part of said one rotary wheel having an engaging end surface perpendicular to said drive shaft, said other rotary wheel having a transverse contact surface perpendicular to said axially parallel shafts and contacting said engaging end surface to preclude axial relative displacement in one axial direction between said one and said other rotary wheels.

13. A drive mechanism according to claim 12, wherein said transmission parts comprise gear teeth, said gear teeth of said one transmission part of said one rotary wheel having one end face which constitutes said engaging end surface.

14. A drive mechanism according to claim 13, wherein said one end face is designated a first end face, said gear teeth of said one transmission part of said one rotary wheel having a second end face parallel to said first end face, the gear teeth of said other transmission part of said one rotary wheel having third and fourth end faces parallel to said first and second end faces, the distance between said first and fourth end faces defining the maximum axial length of said one rotary wheel, the distance between said first and third end faces being greater than the axial length of the gear teeth of said other transmission part of said other rotary wheel.

15. A drive mechanism according to claim 14, wherein said one and said other rotary wheels have the same configuration such that said other rotary wheel has first to fourth end faces corresponding to said first to fourth end faces on said one rotary wheel, said third end face of said other rotary wheel constituting said transverse contact surface.

16. A drive mechanism according to claim 14, wherein said one rotary wheel has a cylindrical portion extending axially between said second and third end faces, said cylindrical portion being coaxial with said driven shaft.

17. A drive mechanism according to claim 12, wherein said one and said other rotary wheels have the same configuration.

* * * * *